United States Patent [19]
Itaba et al.

[11] Patent Number: 5,185,203
[45] Date of Patent: Feb. 9, 1993

[54] HEAT-SEALABLE CROSSLINKED ORIENTED POLYETHYLENE FILM AND PRODUCTION THEREOF

[75] Inventors: Yasushi Itaba; Minoru Izawa; Keichiro Saito; Takayoshi Kondo, all of Kawasaki, Japan

[73] Assignee: Tonen Sekiyukagaku K.K., Tokyo, Japan

[21] Appl. No.: 436,541

[22] Filed: Nov. 14, 1989

[30] Foreign Application Priority Data

Nov. 15, 1988 [JP] Japan ................ 63-288124

[51] Int. Cl.$^5$ .............................. C09J 7/02
[52] U.S. Cl. .................. 428/349; 428/354; 428/355
[58] Field of Search ............... 428/343, 349, 354, 355

[56] References Cited

U.S. PATENT DOCUMENTS

| | | | |
|---|---|---|---|
| 3,088,844 | 5/1963 | Hungerford | 428/349 |
| 3,245,931 | 4/1966 | Matthew | 428/349 |
| 4,020,228 | 4/1977 | Eastes | 428/349 |
| 4,356,222 | 10/1982 | Harakawa | 428/346 |
| 4,590,020 | 5/1986 | Itaba | 525/191 |
| 4,874,665 | 10/1989 | Doheny | 428/345 |
| 4,956,232 | 9/1990 | Balloni | 428/354 |

*Primary Examiner*—Jenna L. Davis
*Attorney, Agent, or Firm*—Kenyon & Kenyon

[57] ABSTRACT

Disclosed are a heat-sealable crosslinked oriented polyethylene film having low-temperature heat sealabilitiy which enables high-speed bag-making, improved in antiblocking property and excellent in clarity and moistureproofness, comprising a crosslinked, biaxially oriented high density polyethylene film in which the degree of crosslinking inwardly decreases across the thickness of the film, and a heat sealing layer placed thereon, the heat sealing layer being composed of a tackifier and an ethylene-vinyl acetate copolymer containing an antiblocking agent or composed of 1,2-polybutadiene containing an antiblocking agent, preferably further comprising a heat sealing layer free from an antiblocking agent placed between the biaxially oriented film and the heat sealing layer containing the antiblocking agent, and a process for the production of the same.

2 Claims, No Drawings

HEAT-SEALABLE CROSSLINKED ORIENTED POLYETHYLENE FILM AND PRODUCTION THEREOF

BACKGROUND OF THE INVENTION

The present invention relates to a heat-sealable crosslinked oriented polyethylene film and a process for producing the same, particularly to an oriented high density polyethylene film having a specific crosslinked structure, having low-temperature heat sealability which can cope with bag-making processes at high speeds, improved in antiblocking property affecting bag-making processes or filling operations of contents, and further excellent in moistureproofness and clarity, and a process for producing the same.

In order to improve the clarity of high density polyethylene films, there have been proposed various oriented polyethylene films homogeneously crosslinked by radiation or the like (Japanese Patent Publication No. 18893/1962).

Such films are improved in clarity and strength, but insufficient in moistureproofness and antiblocking property. Furthermore, the oriented polyethylene films crosslinked to such a degree that the clarity is improved have the drawback that the low-temperature heat sealability is impaired. Thus, such films are not necessarily sufficient in functions as packaging materials.

Then, the present inventors have previously proposed a crosslinked oriented polyethylene film in which the degree of crosslinking inwardly decreases across the thickness of the film (Japanese Patent Unexamined Publication No. 74820/1986).

As described above, the prior-art crosslinked oriented polyethylene films are improved in clarity and the like, but insufficient in moistureproofness. It is therefore necessary that the films are increased in their thickness or provided with barrier resin layers when used for the applications requiring the moistureproofness. For this reason, the clarity and packaging properties of the films are deteriorated, and the production cost rises. However, according to the oriented polyethylene film having the above-mentioned specific crosslinked structure, the film excellent in clarity and moistureproofness can be obtained.

However, this film alone is somewhat poor in heat sealability. For the purpose of improving the heat sealability, it has also previously been proposed to form a heat sealing layer comprising a low density polyethylene (LDPE) or an ethylene copolymer on the above-mentioned film (Japanese Patent Unexamined Publication No. 171149/1985).

On the other hand, in the packaging field, the bag-making processes at high speeds come to be increasingly required, and therefore the development of films good in low-temperature heat sealability has been desired.

According to the above-mentioned composite film, the heat sealability is improved, but there is still room for the improvement of the heat sealability in the high-speed bag-making processes (low-temperature heat sealability).

In order to improve the low-temperature heat sealability, it is necessary to increase the difference in melting point between a substrate and a heat sealing layer. In other words, it is required to select a substrate high in heat resistance and a heat sealing layer low in melting point. However, the melting point (Tm) of the crosslinked polyethylene film described above is generally from 134° to 135° C., so that the substrate has the limitation to the improvement of its heat resistance.

Then, for the purpose of reducing the melting point (Tm) of the heat sealing layer, the present inventors gave attention to hot-melt adhesives and studied various resins low in melting point (Tm). As such an adhesive, an adhesive essentially comprising three components of a copolymer of ethylene and vinyl acetate, liquid cis-1,4-polyisoprene rubber and a tackifier is described in Japanese Patent Publication No. 4592/1987, and the application to a polyethylene substrate is also described therein. However, the hot-melt adhesive is poor in antiblocking property, so that the bag-making processes are adversely affected. Further, when the hot-melt adhesive is used as the heat sealing layer, it is required to take care not to impair the clarity of the crosslinked oriented polyethylene film described above.

SUMMARY OF THE INVENTION

It is therefore an object of the present invention to provide a heat-sealable crosslinked oriented polyethylene film having improved low-temperature heat sealability which enables high-speed bag making and a process for producing the same.

Another object of the present invention is to provide a heat-sealable crosslinked oriented polyethylene film having improved low-temperature heat sealability, and having clarity and antiblocking property which are in balance.

Other objects and novel features of the invention will be apparent from the following description.

In accordance with the present invention, a heat-sealable crosslinked oriented polyethylene film is provided which comprises a crosslinked, biaxially oriented high density polyethylene film in which the degree of crosslinking inwardly decreases across the thickness of said film, and a heat sealing layer placed on at least one surface of said crosslinked, biaxially oriented high density polyethylene film, said heat sealing layer being composed of a tackifier and an ethylene-vinyl acetate copolymer containing an antiblocking agent, and preferably further comprising a heat sealing layer composed of a tackifier and an ethylene-vinyl acetate copolymer free from an antiblocking agent placed between said crosslinked, biaxially oriented high density polyethylene film and said heat sealing layer composed of the tackifier and the ethylene-vinyl acetate copolymer containing the antiblocking agent.

This invention also provides a heat-sealable crosslinked oriented polyethylene film comprising a crosslinked, biaxially oriented high density polyethylene film in which the degree of crosslinking inwardly decreases across the thickness of said film, and a heat sealing layer placed on at least one surface of said crosslinked, biaxially oriented high density polyethylene film, said heat sealing layer being composed of 1,2-polybutadiene containing an antiblocking agent, and preferably further comprising a heat sealing layer composed of 1,2-polybutadiene free from an antiblocking agent placed between said crosslinked, biaxially oriented high density polyethylene film and said heat sealing layer composed of the 1,2-polybutadiene containing the antiblocking agent.

This invention further provides a process for producing a heat-sealable crosslinked oriented polyethylene film which comprises placing a heat sealing layer on at least one surface of a crosslinked, uniaxially oriented high density polyethylene film in which the degree of crosslinking inwardly decreases across the thickness of said film, said heat sealing layer being composed of a tackifier and an ethylene-vinyl acetate copolymer containing an antiblocking agent, preferably further placing a heat sealing layer composed of a tackifier and an ethylene-vinyl acetate copolymer free from an antiblocking agent between said crosslinked, biaxially oriented high density polyethylene film and said heat sealing layer composed of the tackifier and the ethylene-vinyl acetate copolymer containing the antiblocking agent, and then stretching said uniaxially oriented film to a direction perpendicular to the uniaxial orientation direction of said film.

Furthermore, this invention provides a process for producing a heat-sealable crosslinked oriented polyethylene film which comprises placing a heat sealing layer on at least one surface of a crosslinked, uniaxially oriented high density polyethylene film in which the degree of crosslinking inwardly decreases across the thickness of said film, said heat sealing layer being composed of 1,2-polybutadiene containing an antiblocking agent, preferably further placing a heat sealing layer composed of 1,2-polybutadiene free from an antiblocking agent between said crosslinked, biaxially oriented high density polyethylene film and said heat sealing layer composed of the 1,2-polybutadiene containing the antiblocking agent, and then stretching said uniaxially oriented film to a direction perpendicular to the uniaxial orientation direction of said film.

DESCRIPTION OF THE PREFERRED EMBODIMENTS

In the present invention, as the high density polyethylenes are used crystalline polyethylenes produced by medium- or high-pressure processes. Such polyethylenes include ethylene homopolymers and copolymers of ethylene and not more than 2 mol % of other $\alpha$-olefins such as propylene, 1-butene, 1-pentene, 1-hexene, 4-methyl-1-pentene, 1-octene and 1-decene, the homopolymers and the copolymers having a density of at least 0.935 g/m$^3$, preferably at least 0.950 g/m$^3$, and a melt index (JIS K6760, measured at a temperature of 190° C. and a load of 2.16 kg, hereinafter referred to as MI) of at least 0.05 g/minutes, preferably 0.5 to 20 g/10 minutes. There may also be used mixtures of at least 60% by weight of the high density polyethylenes and low density polyethylenes and/or other polyolefins. These high density polyethylenes may be incorporated with known additives such as antioxidants, UV absorbers, slip agents, antiblocking agents, antistatic agents, pigments and dyes.

For the production of the high density polyethylene film in the present invention, such a high density polyethylene is fed to a commonly used extruder, melt extruded and cooled to solidification to form a flat or tubular stock sheet.

For the melt extrusion forming, there may be used any methods such as a method for obtaining the flat stock sheet by extrusion from a conventional T-die, a method for obtaining the tubular stock sheet by extrusion from an annular die, a method for obtaining the flat stock sheet by cutting open the tubular stock sheet and a method for obtaining two flat stock sheets by longitudinally cutting two parts of the tubular stock sheet. In these cases, the thickness of each stock sheet is selected so that the stock sheet can be crosslinked in such a manner that the degree of crosslinking inwardly decreases across the thickness of the stock sheet, and depends upon a draw ratio and the thickness of a stretched sheet. The thickness ranging from 210 to 2,000 microns, preferably from 400 to 1,000 microns, is desirable to handle the stock sheet and to accomplish the crosslinking described above.

In the present invention, it is necessary to crosslink the flat or tubular stock sheet of the high density polyethylene so that the degree of crosslinking inwardly decreases across the thickness of the stock sheet from both surface thereof.

The degree of crosslinking is expressed in terms of gel fraction. For the purpose of achieving the objects of the present invention, it is desirable that an intermediate layer portion where the degree of crosslinking is lowest in the stock sheet has a gel fraction of 0 to less than 5% and both crosslinked outer layer portions of the stock sheet have a gel fraction of at least 5%, preferably 20 to 70%. In the case that the intermediate layer portion has a gel fraction of 0% and crosslinked layer/uncrosslinked layer/crosslinked layer are formed in the thickness direction of the stock sheet, the ratio of the uncrosslinked layer to each of the crosslinked layers is preferably 1:0.1 to 10. In particular, it is preferred that both the outer crosslinked layer portions have the same degree of crosslinking.

If the above-mentioned crosslinking is not performed in such a manner that the degree of crosslinking inwardly decreases across the thickness of the stock sheet, particularly if the intermediate layer portion where the degree of crosslinking is lowest has a gel fraction in excess of 5%, the stock sheet is uniformly stretched, which results in the improvement in clarity. However, the film having improved moistureproofness can not be obtained. Further, if the gel fraction of the crosslinked outer layer portions is lower than 20%, the stock sheet is not uniformly stretched, and therefore the resulting film is not improved in clarity and moistureproofness. On the other hand, if the gel fraction of the outer layer portions exceeds 70%, the stock sheet tends to break during stretching, and therefore can not be smoothly stretched. Furthermore, if the stock sheet is crosslinked uniformly throughout the overall layer portions across the thickness thereof, the stretching is uniformly performed. The resulting film is therefore improved in clarity, but not improved in moistureproofness. On the other hand, if only one side of the outer layer portions of the stock sheet is crosslinked, the stock sheet tends to break during stretching. If the stock sheet is crosslinked throughout the overall layer portions in such a manner that the degree of crosslinking unidirectionally decreases from one surface to the other across the thickness thereof, the resulting film is not satisfactorily improved in both clarity and moistureproofness.

The gel fraction described above is defined by the quantity of insoluble matters which are left undissolved when a sample is extracted with boiling p-xylene.

The above-mentioned crosslinking can be accomplished, for example, by irradiating both surfaces of the stock sheet with electron beams or by multilayer coextrusion of a polyethylene resin which contains a different amount of crosslinking agent for individual layer portions.

The exposure dose of electron beams varies depending on the thickness of the stock sheet, and the type, molecular weight and molecular weight distribution of the polyethylene resin. However, it is usually 5 to 50

Mrad, preferably 15 to 30 Mrad. Both sides of the stock sheet may be irradiated at the same time, one after the other, or repeatedly several times. It is particularly preferred to irradiate both sides with the same exposure dose. The penetrating power of electron beams is adjusted by changing the applied voltage according to the thickness of the stock sheet or by masking the stock sheet with a shield.

Then, an example of methods for adjusting the exposure dose of electron beams is hereinafter described.

For example, in the case that the thickness of the stock sheet to be irradiated is 500 microns, 25 thin films having a thickness of 20 microns are tightly overlapped one another to form an about 500 micron-thick sample. The sample is irradiated from both sides thereof with the same exposure dose of electron beams to crosslink it. The crosslinked sample is separated into 25 thin films having a thickness of 20 microns. The degree of crosslinking of each sheet is measured, and thereby the distribution of the degree of crosslinking across the thickness of the sample can be known. This result reveals the relationship between the thickness of the stock sheet and the degree of crosslinking produced by the irradiation of electron beams.

The above-mentioned irradiation of electron beams is preferably carried out in an atmosphere of nitrogen, argon, helium or another inert gas. Although the irradiation of electron beams can be performed in the presence of air, the resulting film is insufficiently improved in clarity.

The crosslinking by the multilayer coextrusion of a high density polyethylene resin containing a crosslinking agent is accomplished, for example, in such a manner that the high density polyethylene resin containing the crosslinking agent such as an organic peroxide is fed to an extruder which forms both outer layer portions in the case of the flat stock sheet, or the inner and outer layer portions in the case of the tubular stock sheet, and another high density polyethylene resin containing no organic peroxide or containing an organic peroxide in an amount just enough to achieve the minimum degree of crosslinking is fed to another extruder which form the intermediate layer portion, followed by coextrusion and crosslinking at a temperature higher than their melting point.

The biaxially oriented high density polyethylene film crosslinked in such a manner that the degree of crosslinking inwardly decreases across the thickness thereof can be obtained by heating the crosslinked stock sheet and by biaxially stretching it at a predetermined draw ratio by conventional rolling, tentering or tubular methods. The biaxial stretching may be accomplished by either simultaneous stretching or sequential stretching.

The stretching temperature is lower than the melting point of the high density polyethylene resin, preferably within the range from the softening point to the melting point of the resin, and specifically 70° to 135° C., preferably 100° to 130° C. If the stretching temperature is lower than the softening point, the resin is insufficiently softened, and therefore uniform stable stretching can not be achieved. On the other hand, if the stretching temperature exceeds the melting point, the resulting film is insufficiently improved in moistureproofness, although the stock sheet is uniformly stretched.

The draw ratio is desirably greater than 3 times, preferably greater than 4 times in both longitudinal and lateral directions. If the draw ratio is lower than 3 times, uniform stretching can not be achieved and the oriented film is insufficiently improved in clarity and moistureproofness. The oriented film thus obtained has heat-shrinkable properties. Hence, when the oriented film is used as a substrate of a composite film for packaging, it is preferred to heat set the oriented film at a temperature lower than the melting point thereof, for example, at 110° to 140° C. to reduce the heat shrinkage percentage in the lateral direction to 1.5% or less, preferably to 1.0% or less.

The heat sealing layer used in the present invention contains the antiblocking agent, or comprises a heat sealing layer (inner layer) free from the antiblocking agent and a heat sealing layer (outer layer) containing the antiblocking agent.

The heat sealing layer comprising two layers of inner and outer layers is preferred from the viewpoint of clarity.

Examples of the antiblocking agents include silica, zeolite, mica, calcium silicate, talc, bentonite, hydrotalcite, metal oxides, metal hydroxides, metal carbonates and metal sulfates. Of these, silica and zeolite are preferable. It is preferred from the viewpoint of antiblocking property and clarity that the mean particle size thereof is 2.5 to 20 microns. Further, it is preferred from the viewpoint of heat sealability and antiblocking property that the content (added amount) thereof is 0.3 to 2% by weight.

As to the heat sealing layer, both the inner and outer layers comprise the ethylene-vinyl acetate copolymer (hereinafter referred to EVA) and the tackifier, or comprise 1,2-polybutadiene.

It is preferred from the viewpoint of low-temperature heat sealability enabling the high-speed bag making and clarity that the above-mentioned EVA contains 20 to 50% by weight of vinyl acetate and has a melting point of 80° C. or less.

The EVA may be copolymerized with a small amount of a third component such as a diene monomer and also modified with an unsaturated carboxylic acid or the like.

As the tackifiers, cyclopentadiene-series petroleum resins made from petroleum unsaturated hydrocarbons or hydrogenated petroleum resins obtained by adding hydrogen thereto are preferably used. There are also mentioned polyterpene resins, rosin resins, cumarone-indene resins and phenolic resins.

It is preferred from the viewpoint of stickiness and antiblocking property that the tackifier is added to the EVA in an amount of 10 to 50% by weight.

1,2-Polybutadiene is obtained by polymerizing butadiene and has the following structural unit:

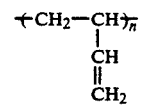

For the purpose of obtaining the desired heat-sealable film of the present invention, syndiotactic 1,2-polybutadiene is preferable which contains 90% of 1,2-bonds and has a mean molecular weight of one hundred thousand and tens of thousands and a crystallinity of 15 to 35%.

This 1,2-polybutadiene is excellent also in clarity.

In this invention, methods for laminating the crosslinked, biaxially oriented high density polyethylene film described above with the heat sealing layer containing the antiblocking agent, or with the heat sealing layer free from the antiblocking agent and the heat sealing layer containing the antiblocking agent in turn include (1) a method in which the resin for each heat sealing layer is melt extruded to form the heat sealing layer, with which the above-mentioned crosslinked oriented film is laminated, and (2) a method in which a film to form each heat sealing layer is previously prepared, and then this film is bonded to the crosslinked oriented film.

The ratio of the thickness of the outer heat sealing layer containing the antiblocking agent to that of the inner heat sealing layer free from the antiblocking agent is preferably about 1:1–10, with consideration of a balance between clarity (haze) and antiblocking property, It is preferred that the whole of the heat sealing layers is 1 to 50 microns in thickness.

In the above description, the heat-sealable crosslinked oriented polyethylene film having two heat sealing layers according to the present invention is produced by laminating the crosslinked, biaxially oriented polyethylene film with the heat sealing layers. However, it is also possible to produce the film of the present invention by laminating a crosslinked unoriented film with the heat sealing layers and thereafter biaxially stretching it.

In the present invention, there is hereinafter described a manufacturing method suitable for the crosslinked, biaxially oriented polyethylene film having the specific crosslinked structure, which can be improved in clarity and antiblocking property. Namely, the polyethylene film crosslinked in such a manner that the degree of crosslinking inwardly decreases across the thickness of the film is first uniaxially stretched, and then laminated with two heat sealing layers by the above-mentioned method, followed by stretching in the direction perpendicular to the above stretching direction.

In the film of the present invention, the single heat sealing layer composed of the tackifier and the ethylene-vinyl acetate copolymer containing the antiblocking agent, or composed of having 1,2-polybutadiene containing the antiblocking agent may be placed on at least one surface of the above-mentioned crosslinked, biaxially oriented high density polyethylene film. In particular, according to the above-mentioned method comprising the crosslinking, the uniaxial stretching, the lamination of the heat sealing layers and the stretching in the perpendicular direction, there can be obtained the heat-sealable crosslinked oriented polyethylene film of the present invention having a balance between clarity and antiblocking property.

The present invention will be described with reference to the following Examples and Comparative Examples.

In Examples and Comparative Examples, parts and percentages given are by weight unless otherwise noted, and the test methods employed are as follows:

(1) Haze: In accordance with JIS K6714
(2) Heat sealing temperature: Using a hot plate heat sealer, heat sealing surfaces of film sheets are contact bonded to each other to a width of 15 mm at a predetermined temperature and a pressure of 2 kg/cm$^2$ for 1 second to form a heat sealing portion. The resulting heat sealing portion is peeled at a peeling speed of 500 mm/minute, and a temperature at which the peeling strength reaches 500 g/15 mm is taken as a heat sealing temperature.
(3) Antiblocking degree: A film to which a load of 20.8 g/cm$^2$ is applied is aged under the constant temperature circumstance of a temperature of 50° C. and a relative humidity of 50% for 24 hours, and then the slippage property (ASTM D1894) is measured.
(4) Water-vapor permeability: In accordance with JIS Z 0208, Method B
(5) Gel fraction: In accordance with ASTM D2745, Method A

EXAMPLE 1

High density polyethylene (density: 0.957 g/cm$^3$, MI: 1.9 g/10 minutes, melting point: 134° C., hereinafter referred to as HDPE) was formed into a 0.48 mm-thick flat stock sheet by using a T-die extruder. Both sides of the stock sheet were irradiated with electron beams of 20 Mrad under the condition of 165 kV-45 mA in an atmosphere of nitrogen gas by using an electron beam irradiation apparatus (manufactured by ESI Co.). In order to know the gradient of the degree of crosslinking across the thickness of the sheet, 30 thin HDPE films having a thickness of 20 microns described above were overlapped one another to form a 0.6 mm-thick test piece, which was irradiated with electron beams under the same conditions as mentioned above. Then, the degree of crosslinking of the respective thin films was measured. The gel fraction of both the outer thin films was 50%, and the gel fraction of the inner thin film across the thickness of the test piece was 0%. The ratio of the thickness of crosslinked layer/uncrosslinked layer/crosslinked layer (hereinafter simply referred to as C/U/C) was 1:1:1.

This crosslinked stock sheet was longitudinally stretched 4 times at a temperature of 130° C. to obtain an uniaxially oriented film.

By using an in-line coater, on one surface of this uniaxially oriented film were placed an inner heat sealing layer consisting of 90% by weight of an EVA (density: 0.930 g/cm$^3$, MI: 15 g/10 minutes, vinyl acetate: 35% by weight, melting point: 59° C.) and 10% by weight of a hydrogenated petroleum resin (Escorez E5280, manufactured by Exxon Chemical Co.) (this composition consisting of the EVA and silica is hereinafter referred to TS-5), and an outer heat sealing layer consisting of TS-5 containing 1% of silica (S-161, manufactured by Fuji-Davison Chemical Ltd., particle size: 7 microns). This laminated product consisting of the longitudinally stretched film, the inner heat sealing layer free from silica and the outer heat sealing layer containing silica was 25 microns in thickness. The ratio of the thickness of the inner heat sealing layer free from silica to that of the outer heat sealing layer containing silica was 4:1.

This laminated product was stretched 6 times at a temperature of 130° C. in the direction perpendicular to the uniaxial orientation direction described above, thereby obtaining a heat-sealable crosslinked, biaxially oriented polyethylene film.

The properties of this film are shown in Table 1.

EXAMPLE 2

An crosslinked, biaxially oriented polyethylene film was obtained in the same manner as with Example 1, except that 1,2-polybutadiene (density: 0.96/cm$^3$, amount of 1,2-bonds: 92%, melting point: 80° C., RB-820, manufactured by Japan Synthetic Rubber Co.) was used in the place of TS-5.

The properties of the resulting film are shown in Table 1.

EXAMPLE 3

An crosslinked, biaxially oriented polyethylene film was obtained in the same manner as with Example 1, except that the longitudinally oriented film was laminated with a single heat sealing layer consisting of TS-5 containing 1% of silica.

The properties of the resulting film are shown in Table 1.

COMPARATIVE EXAMPLE 1

An crosslinked, biaxially oriented polyethylene film was obtained in the same manner as with Example 3, except that no silica is added.

The properties of the resulting film are shown in Table 1.

COMPARATIVE EXAMPLE 2

An crosslinked, biaxially oriented polyethylene film was obtained in the same manner as with Example 2, except that a single heat sealing layer of 1,2-polybutadiene free from silica was used in the place of the double layers used in Example 2.

The properties of the resulting film are shown in Table 1.

COMPARATIVE EXAMPLE 3

An crosslinked, biaxially oriented polyethylene film was obtained in the same manner as with Comparative Example 2, except that EVA was used in the place of 1,2-polybutadiene.

The properties of the resulting film are shown in Table 1.

TABLE 1

| | Structure of Film | | | | | | |
|---|---|---|---|---|---|---|---|
| | HDPE Substrate Layer | | | | Structure of Heat Sealing Layer Ratio of Thickness | | Additive to Heat Sealing Layer Silica(S-161) |
| | Structure of Crosslinking (C/U/C) | Thickness μ | Resin for Lamination Name | Thickness of Heat Sealing Layer μ | Free from Silica | Containing Silica | |
| Example 1 | 1:1:1 | 20 | TS-5 (EVA/hydrogenated resin, Escorez E5280) | 5 | 4:1 | | 1% |
| Example 2 | 1:1:1 | 20 | RB-820 (cispolybutadiene) | 5 | 4:1 | | 1% |
| Example 3 | 1:1:1 | 20 | TS-5 | 5 | 0:5 | | 1% |
| Comparative Example 1 | 1:1:1 | 20 | TS-5 | 5 | 5:0 | | Free from silica |
| Comparative Example 2 | 1:1:1 | 20 | RB-820 | 5 | 5:0 | | Free from silica |
| Comparative Example 3 | 1:1:1 | 20 | EVA | 5 | 5:0 | | Free from silica |

| | Properties of Film | | | |
|---|---|---|---|---|
| | Haze % | Heat Sealing Temperature °C. | Antiblocking Degree g/cm$^2$ | Water-Vapor Permeability g/m$^2$/24 hours |
| Example 1 | 4.6 | 70 | 13 | 2.3 |
| Example 2 | 4.0 | 75 | 35 | 2.3 |
| Example 3 | 8.7 | 70 | 12 | 2.3 |
| Comparative Example 1 | 4.0 | 70 | 80 or more | 2.3 |
| Comparative Example 2 | 3.5 | 75 | 80 or more | 2.3 |
| Comparative Example 3 | 4.7 | 90 | 50 | 2.3 |

We claim:

1. A heat-sealable crosslinked oriented polyethylene film comprising a crosslinked, biaxially oriented high density polyethylene film in which the degree of crosslinking inwardly decreases across the thickness of said film,
   a first heat sealing layer placed on at least one surface of said crosslinked, biaxially oriented high density polyethylene film, said first heat sealing layer consisting essentially of a tackifier and an ethylene-vinyl acetate copolymer containing an antiblocking agent, said first heat sealing layer having a thickness, and
   a second heat sealing layer consisting essentially of a tackifier and an ethylene-vinyl acetate copolymer free from an antiblocking agent is further placed between said crosslinked, biaxially oriented high density polyethylene film and said first heat sealing layer consisting essentially of the tackifier and the ethylene-vinyl acetate copolymer containing the antiblocking agent, said second heat sealing layer having a thickness,
   wherein the ration of the thickness of said first heat sealing layer containing the antiblocking agent to the thickness of said second heat sealing layer free from the antiblocking agent is about 1:1-10.

2. A heat-sealable crosslinked oriented polyethylene film comprising a crosslinked, biaxially oriented high density polyethylene film in which the degree of crosslinking inwardly decreases across the thickness of said film,
   a first heat sealing layer placed on at least one surface of said crosslinked, biaxially oriented high density polyethylene film, said first heat sealing layer consisting essentially of 1,2-polybutadiene containing an antiblocking agent, said first heat sealing layer having a thickness, and
   a second heat sealing layer consisting essentially of a 1,2-polybutadiene free from an antiblocking agent is further placed between said crosslinked, biaxially oriented high density polyethylene film and said first heat sealing layer consisting essentially of the 1,2-polybutadiene containing the antiblocking agent, said second heat sealing layer having a thickness,
   wherein the ratio of the thickness of said first heat sealing layer containing the antiblocking agent to the thickness of said second heat sealing layer free from the anti-blocking agent is about 1:1-10.

* * * * *

UNITED STATES PATENT AND TRADEMARK OFFICE
CERTIFICATE OF CORRECTION

PATENT NO. : 5,185,203

DATED : February 9, 1993

INVENTOR(S) : Y. ITABA et al.

It is certified that error appears in the above-identified patent and that said Letters Patent is hereby corrected as shown below:

In Claim 1, Col. 10, line 15, delete "ration" and insert -- ratio --.

Signed and Sealed this

Seventh Day of December, 1993

*Attest:*

BRUCE LEHMAN

*Attesting Officer*  *Commissioner of Patents and Trademarks*